Feb. 22, 1966 G. L. CLAPPER 3,237,025
COMPARATOR CIRCUIT
Filed Dec. 28, 1962
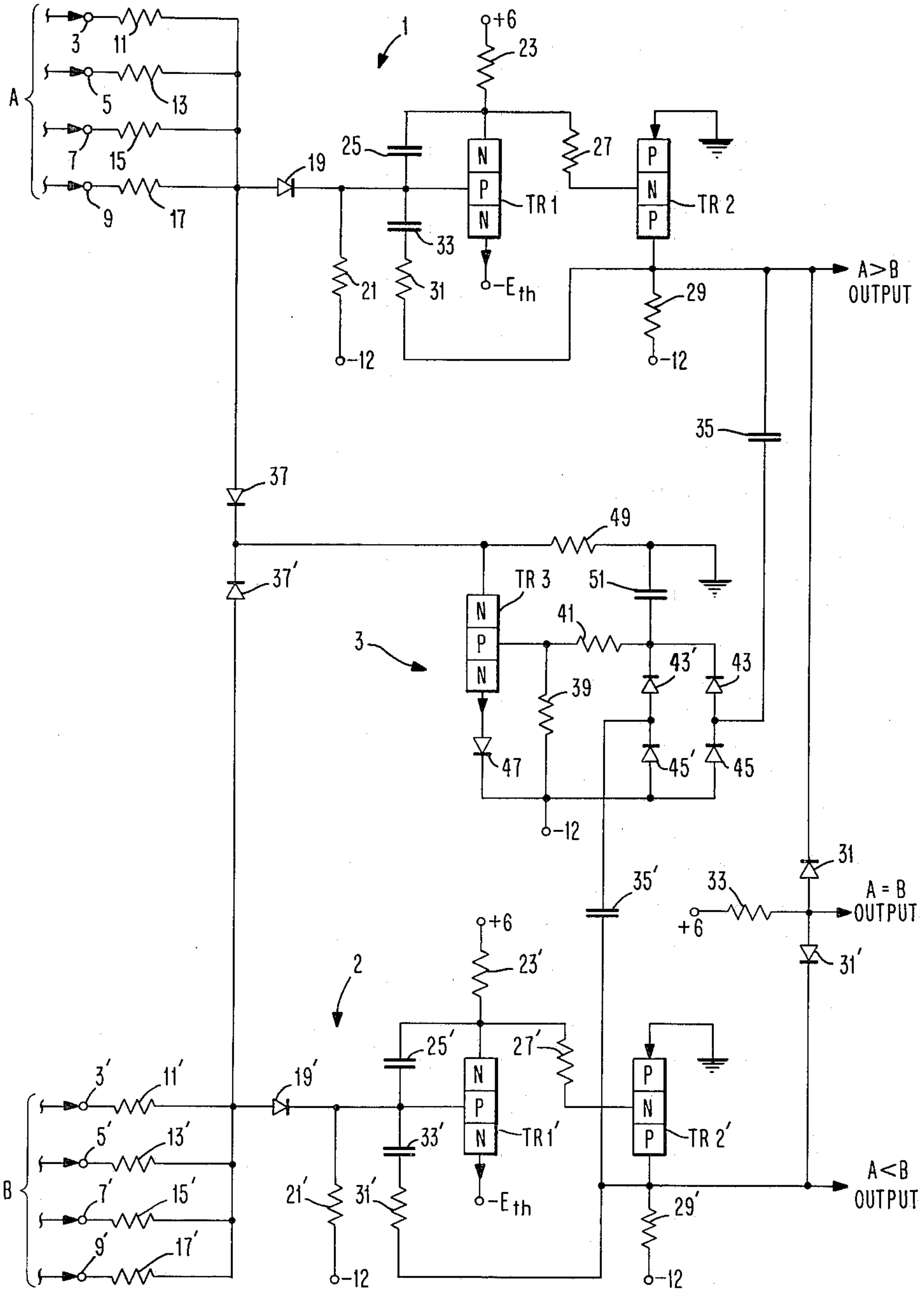
INVENTOR
GENUNG L. CLAPPER
BY Paul M. Brennan
AGENT United States Patent Office 3,237,025
Patented Feb. 22, 1966

3,237,025
COMPARATOR CIRCUIT

Genung L. Clapper, Vestal, N.Y., assignor to International Business Machines Corporation, New York, N.Y., a corporation of New York Filed Dec. 28, 1962, Ser. No. 248,157
5 Claims. (Cl. 307—88.5)

The present invention relates to comparator circuits, and particularly to an improved comparator circuit which employs circuitry of a type found in certain varieties of electrically simulated neurons.

In U.S. patent application Serial No. 162,127, filed on Dec. 26, 1961, by G. L. Clapper, now Patent 3,165,644, granted Jan. 12, 1965, and assigned to the common assignee, there is described and claimed an adaptive decision unit of the type which simulates the action of neurons found in animal nervous systems. The present invention is an improvement of the arrangement shown and described and claimed in the aforementioned application in that it utilizes two of the neural elements together with a common inhibiting circuit to provide a novel means for comparing input signals for equality or inequality.

The present invention has for its principal object a provision of a new and improved comparator circuit utilizing components of the type heretofore employed in simulated neurons.

Another object of the invention is to provide a new and improved form of comparator circuit in which two simulated neuron elements are provided with a common inhibiting circuit, such that neither of the two neural elements is effective in providing outputs unless both inputs are equal.

A further object of the invention is to provide a new and improved comparator circuit for comparing the value of input signals, to determine whether or not equal inputs are present from both sets of input signals.

Another object of the invention is to provide an improved comparator circuit which can provide high, low and equal indications of the respective values of two inputs.

Briefly described, the comparator circuit of the present invention comprises a first and a second neuron simulating element, each of which is supplied with a plurality of inputs, these inputs constituting first and second sources of input signals which are to be compared. The outputs of the neural elements are supplied to a common inhibit circuit, the common inhibit circuit being arranged so that the output therefrom is returned to the inputs of the neural elements, in such manner that the common inhibiting circuit prevents one or the other of the two neural elements from providing an output except in those cases where the inputs to the neural elements are equal, at which time an output is provided from both neural elements to an output circuit. The neural element which is effective at any one time can provide a high or low output signal.

The foregoing and other objects, features and advantages of the invention will be apparent from the following more particular description of a preferred embodiment of the invention, as illustrated in the accompanying drawing.

The single accompanying drawing is a diagrammatic illustration of a preferred embodiment of the invention.

Referring to the drawing, there is shown a preferred embodiment of the invention arranged to compare signals supplied from two different sets of four possible signal inputs each, and to provide an output signal indicating equality or inequality of the input signals supplied from the two inputs. As shown, the apparatus includes a first and a second simulated neural element or neuron 1 and 2, each of which is connected to a common inhibiting circuit designated generally by reference character 3. The first of the two neural elements has inputs supplied thereto via terminals 3, 5, 7 and 9 which are connected to the base of a first transistor TR1 by a circuit including the series resistors 11, 13, 15 and 17, which are commoned and connected through a diode 19 to the base of transistor TR1. As indicated, these may be considered the A inputs. A −12 volt source is connected also to the base of transistor TR1 via a resistor 21. The collector of transistor TR1 is connected to a positive potential +6 via a resistor 23, and the emitter is connected to a source of negative voltage designated by the reference character −E*th*, this source being a variable threshold source which can be manually set in accordance with predetermined conditions, as will be subsequently explained. Transistor TR1 has its collector connected to its base via a degenerative feedback path including a capacitor 25, and also has the collector connected to a base of a second transistor TR2 via a resistor 27. Transistor TR2 has its emitter connected to ground, as shown, and its collector is connected to a −12 volt source via a resistor 29. A regenerative feedback path from the collector of transistor TR2 to the base of transistor TR1 includes a resistor 31 and capacitor 33 connected in series. The output from transistor TR2 is supplied to an output designated A>B OUTPUT. The ouput from transistor TR2 is also connected via a diode 31 to the common output terminal designated as A=B OUTPUT, and to a +6 source of potential via resistor 33. The inhibit circuit 3 has an input connection from the collector of transistor TR2 including a capacitor 35, and the output of the common inhibit circuit 3 is connected via a diode 37 to the input of the first neural element 1.

The second neural element which accepts inputs from the second set of signal sources, designated as B, and which is designated generally by reference character 2, is similar in construction to the first network, and accordingly, the similar parts are designated by the same reference characters as used in describing the first network, with primes added to distinguish the parts from the first set. The output of the second neural element is also supplied to an output designated A<B OUTPUT.

The common inhibit circuit 3 includes a transistor TR3 which has its base connected to a negative source of potential −12 via a resistor 39, with the base also being connected to the coupling capacitors 35 and 35′ via a circuit including a resistor 41, and the diodes 43 and 43′, respectively, the diodes functioning as an OR circuit. These input connections are clamped to the −12 volt level by a pair of associated clamping diodes 45 and 45′. The emitter of transistor TR3 is connected to −12 volts via diode 47 which serves as a voltage regulated bias source, and the collector of transistor TR3 is connected to ground via resistor 49. The capacitor 51 is connected between ground and the junction between diodes 43 and 43′ and the input limiting resistor 41. The collector of transistor TR3 is also connected to the inputs of the two neural elements 1 and 2 via the diodes 37 and 37′.

It is believed that the description of the apparatus according to the invention will be enhanced by describing its operation under various input signal conditions. Considering the first condition which may be applicable to the operation of the circuit, it will be assumed that initially the threshold voltage −E*th* is set, for example, at 8 volts to condition the circuit to respond to two out of four inputs applied to the input circuits. Considering the inputs applied to the first network, these inputs, when two out of four input signals are up, will cause transistor TR1 to turn on through diode 19 since the base of transistor TR1 will then be more positive than the threshold voltage −E*th*. When transistor TR1 turns on, the collector voltage will drop slowly under the integrating control of the degenerative feedback path including the capacitor 25. When this voltage has dropped to zero volts, transistor TR2 will conduct and regenerative feedback supplied via resistor 31 and capacitor 33 will cause a sharp drop in the collector voltage of transistor TR1 and a sharp rise in the output circuit of the first neural element connected via diode 31 to the output. This sharply rising output voltage is coupled via capacitor 35 and diode 43 to the junction point connected to capacitor 51. This causes transistor TR3 to conduct and the output circuit connected to diodes 37 and 37′ will drop, which results in pulling down the common input connection for each of the networks 1 and 2. With the potential reduced at these points, both inputs are inhibited at this time. After the positive feedback transient dies out, integration will resume as the voltage at the collector of transistor TR1 rises. When this voltage reaches zero volts, transistor TR2 cuts off, the output of the first network drops, the input at transistor TR1 drops and the output at the collector rises.

Accordingly, the inhibiting pulses fed back to the input resistor network will repeatedly lower the input via diode 19 so that an oscillatory action takes place, with the frequency depending upon the circuit parameters and particularly on the sum of the applied signal voltages.

In similar manner, the elements comprising the second neural element 2 operate in like fashion, considered by themselves.

Because of the inhibit pulses supplied from the common inhibit circuit, the neural element 1 or 2 which does not have sufficient inputs is prevented from operating since the signal supplied to the input transistor is never able to overcome the —E*th* bias voltage, because the inhibit pulses are continually subtracting from the input signals.

Now, considering the case where the system is to compare inputs supplied to the inputs of both neural elements, it will first be assumed that simultaneous input signals are being supplied to two of the four inputs of the first neural element 1, and input signals are being supplied to only one of the four inputs of the second neural element 2.

Under this first set of comparing conditions, the output from the inhibit circuit 3 will be such that the voltage at the common connection of the inputs to the second neural network, that is, the junction point of the resistors 11′, 13′ 15′ and 17′, cannot rise high enough to overcome the threshold voltage of transistor TR1′. This is because the inhibit circuit 3 will be attempting to reduce the voltage at the junction point of the input resistors for the neural element 2. Under such circumstances, only the neural element 1 will emit output pulses; and, although these output pulses are supplied to the common output circuit, they are ineffective to raise the voltage thereof, since the diodes 31 and 31′, in connection with resistor 33, form a coincidence or AND circuit; and, with the absence of an input from a second neural element, no output signal will be supplied at this time. Thus, under these circumstances, an inequality in the inputs between the first and the second neural elements is indicated by the lack of an output signal at the terminal A=B OUTPUT. The nature of the inequality is, however, indicated by the presence of output pulses at the A>B OUTPUT.

In similar fashion, if the inputs to the second neural element 2 are greater in number than those supplied to the element 1, the common inhibit circuit 3 will cause the inputs to neural element 1 to remain below the threshold for causing conduction of transistor TR1, with the result that only the output from neural element 2 is active; and, since there is no output from neural element 1, the A=B OUTPUT from the coincidence circuit comprising diodes 31 and 31′ is not effective, although the A<B OUTPUT will indicate the nature of the inequality.

Now, considering the third instance in which there are equal inputs, say two input signals for each of the elements 1 and 2, each of the integrating pulse shapers included in the neural elements operates as previously described. Since both of the outputs of the neural elements 1 and 2 are feeding pulses to the inhibit circuit, the inhibit time will be slightly increased as the result of the increased input to the inhibit circuit, and the resultant period of both of the integrating pulse shapers is increased and is synchronized then at a common output frequency. With both elements 1 and 2 providing outputs to the coincidence output circuit, this circuit will now emit a stream of pulses indicating the equality of the inputs.

While the invention has been particularly shown and described with reference to a preferred embodiment thereof, it will be understood by those skilled in the art that various changes in form and details may be made therein without departing from the spirit and scope of the invention.

What is claimed is:

1. A comparator circuit comprising, in combination, a first input network for summing a first plurality of input signals supplied thereto, a second input network for summing a second plurality of input signals supplied thereto, a first integrating pulse shaper connected to said first input network and responsive to a predetermined integrated value of the summed input signals to provide an output pulse, a second integrating pulse shaper connected to said second input network and responsive to a predetermined integrated value of the summed input signals to provide an output pulse, a common inhibiting circuit connected to said first and said second integrating pulse shapers and responsive to the outputs from said first and said second integrating pulse shapers for generating an inhibit signal, circuit means for supplying the outputs from said common inhibiting circuit to said first and said second input network whereby the inhibit signal reduces the summation of the inputs supplied to said networks, and output circuit means for providing an output when and only when said first and said second integrating pulse shapers are concurrently providing outputs.

2. A comparator circuit as claimed in claim 1, further comprising time constant elements for determining the time interval over which said integrating pulse shapers must integrate a signal of predetermined magnitude for providing an output signal therefrom.

3. A comparator circuit comprising, in combination, a first and a second input summing network, each comprising a plurality of resistors to which input signals may be supplied singly or in combinations, whereby the voltage at the output of the network is proportional to the number of input signals supplied to the network, a first and a second integrating pulse shaper, each having an input connected to the first and the second input summing networks respectively, said integrating pulse shapers being effective to provide an output pulse only when the integrated value of the input signals supplied thereto exceeds a predetermined minimum value, a common inhibiting circuit connected to said first and said second integrating pulse shapers and responsive to the output pulses from said pulse shapers to produce for each output pulse an inhibiting pulse of subtractive polarity with respect to the polarity of the input signals, means for supplying the subtractive pulses from said common inhibit circuit to said input summing networks, whereby the subtractive pulses are effective to reduce the voltage at the output of the networks so that the network having the lesser inputs supplied thereto is ineffective to render the associated integrating pulse shaper operative, and an output coincidence circuit effective to provide an output only when both pulse shapers concurrently provide an output, thereby indicating the equality of the inputs supplied to said first and said second input summing network.

4. A comparator circuit comprising, in combination, a first and a second input circuit each for summing a first and a second plurality of applied voltages to be compared, a first and a second integrating pulse shaper to which said summed voltages are applied and responsive to a predetermined summation of applied voltage for generating an output, said integrating pulse shapers including a charging circuit to which said summed voltage is applied wherein the magnitude of said summed voltage determines the time interval through which said summed voltage must be applied to reach said predetermined summation of voltage for generating an output, a common inhibit circuit connected to said integrating pulse shapers and responsive to outputs therefrom to become operative to reduce the summed voltages to a predetermined low value, wherein the integrating pulse shaper having the lowest input voltage is inhibited from producing an output, and a coincidence output circuit connected to said pulse shapers for supplying an output when and only when both of said pulse shapers concurrently provide outputs, thereby indicating an equality of the applied voltages.

5. A comparator circuit comprising, in combination, a first and a second input summing network each including a plurality of weighting resistors connected between respective input terminals and a common input junction, a first and a second integrating pulse shaper having their inputs connected to the common input junctions of said first and said second input summing network, respectively, each of said pulse shapers comprising an input diode poled to pass input signals of one polarity only, a first amplifier inverter means having an output circuit and an input circuit, said input circuit being connected to said diode to receive input signals, a second amplifier inverter means having an output circuit and having an input circuit connected to the output of said first amplifier inverter means, degenerative feedback circuit means connected between the output circuit of said first amplifier inverter means and said input circuit means and responsive to said input signals for effecting operation of said first and second amplifier inverter means in an integrating mode to produce an integrated output pulse in the output circuit of said second amplifier means, and a regenerative feedback circuit means connected between the output circuit of said second amplifier inverter means and the input circuit means of said first amplifier inverter means and responsive to the transient portions of said integrated output pulse for effecting operation of both said amplifier inverter means in a pulse shaping mode to shape said integrated output pulse, a common inhibiting circuit having an input and an output and responsive to input pulses to produce an inhibiting signal, means including capacitor coupling means for coupling the input of said common inhibiting means to the output circuits of both of said integrating pulse shapers, diode coupling means for supplying said inhibiting signals to the common input junctions of said networks, and an output circuit responsive to concurrent outputs from each of said integrating pulse shapers.

References Cited by the Examiner

UNITED STATES PATENTS

| | | | |
|---|---|---|---|
| 3,097,349 | 7/1963 | Putzrath et al. | 307—88.5 XR |
| 3,165,644 | 1/1965 | Clapper | 307—88.5 |

OTHER REFERENCES

"Electronics Learns from Biology," by Alan Corneretto, Electronics Design, Sept. 14, 1960 (page 40 relied upon).

ARTHUR GAUSS, *Primary Examiner.*